Aug. 19, 1941. W. A. HOLTZMAN 2,253,296
SCREEN FOR THRESHING MACHINES
Filed Nov. 21, 1938 3 Sheets-Sheet 3
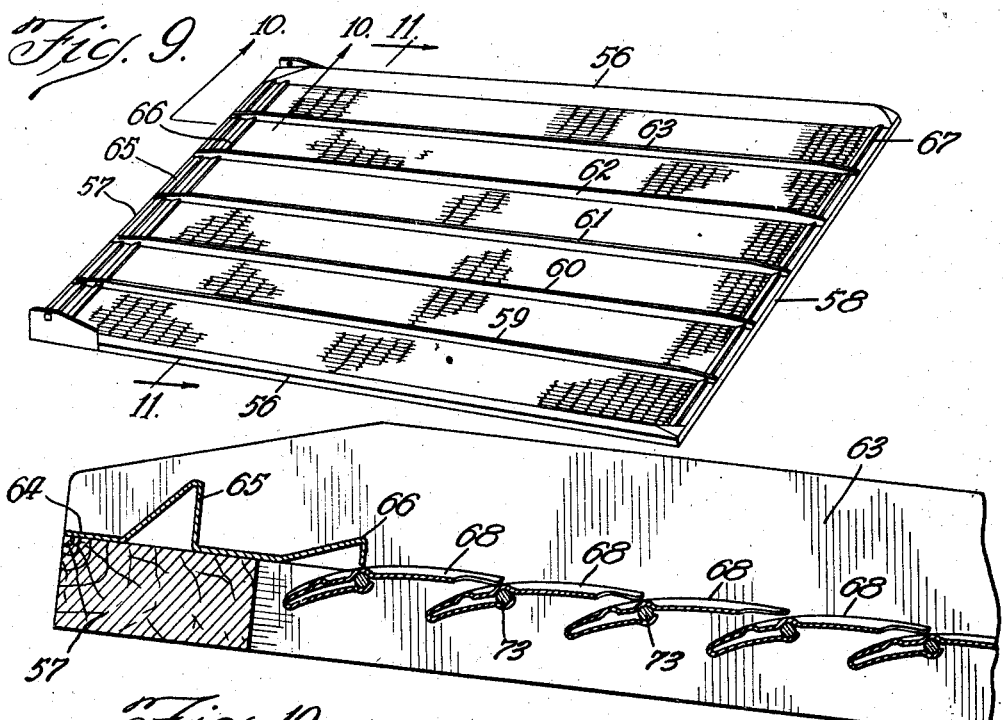
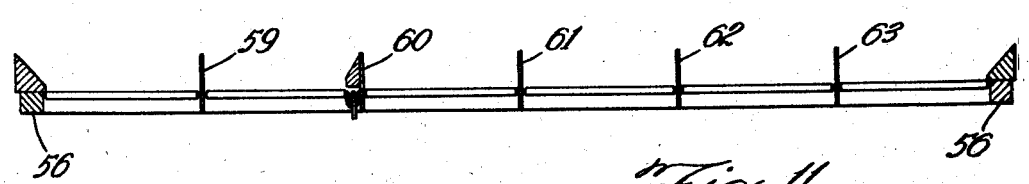
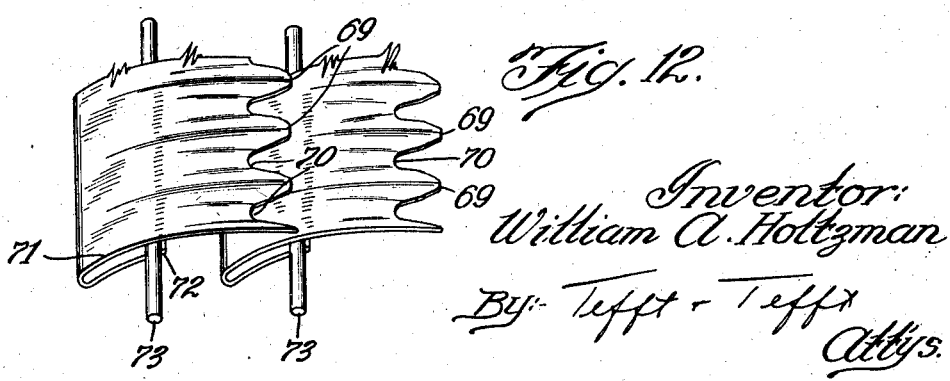
Inventor:
William A. Holtzman
By: Tefft + Tefft
Attys.

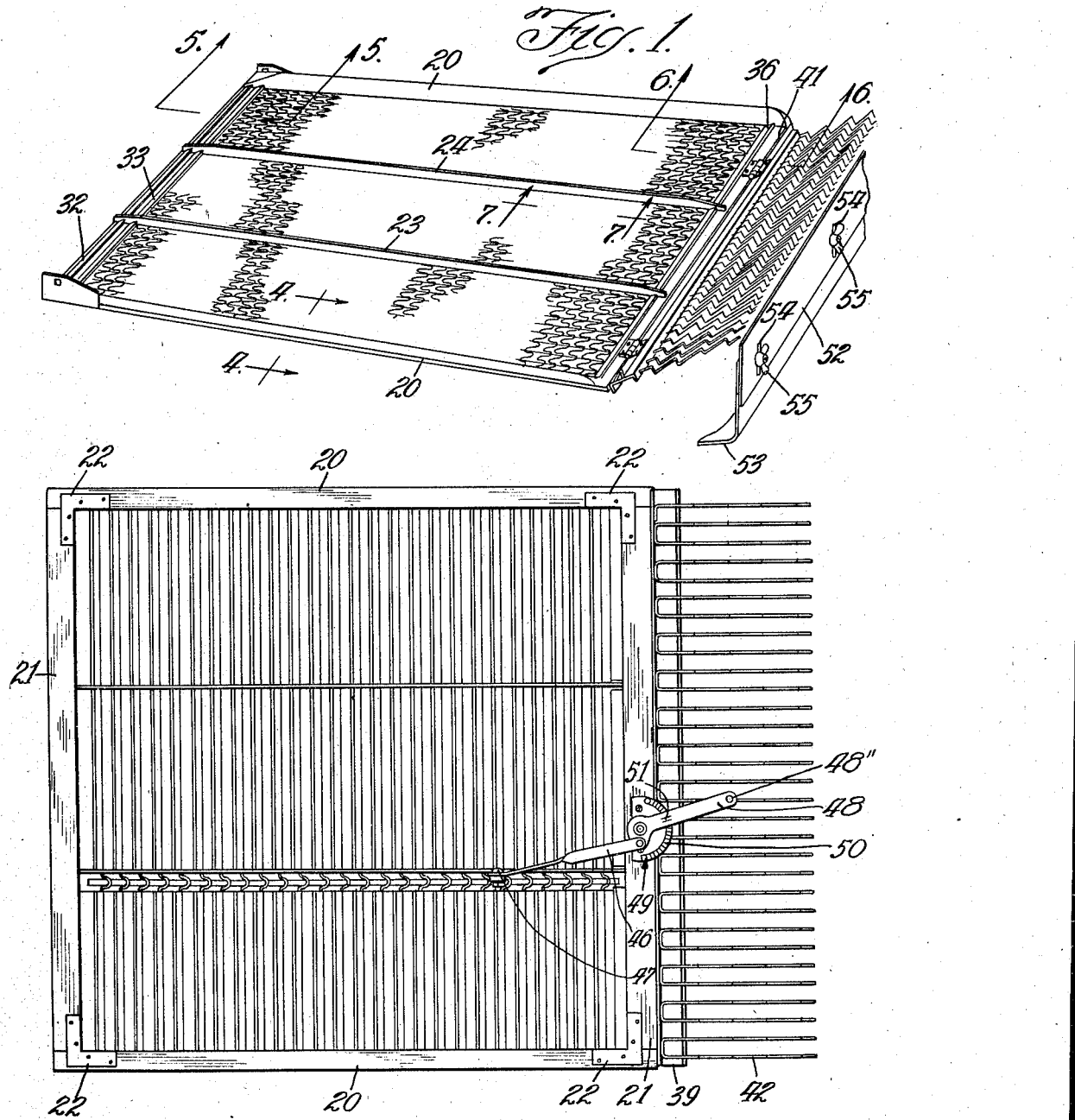

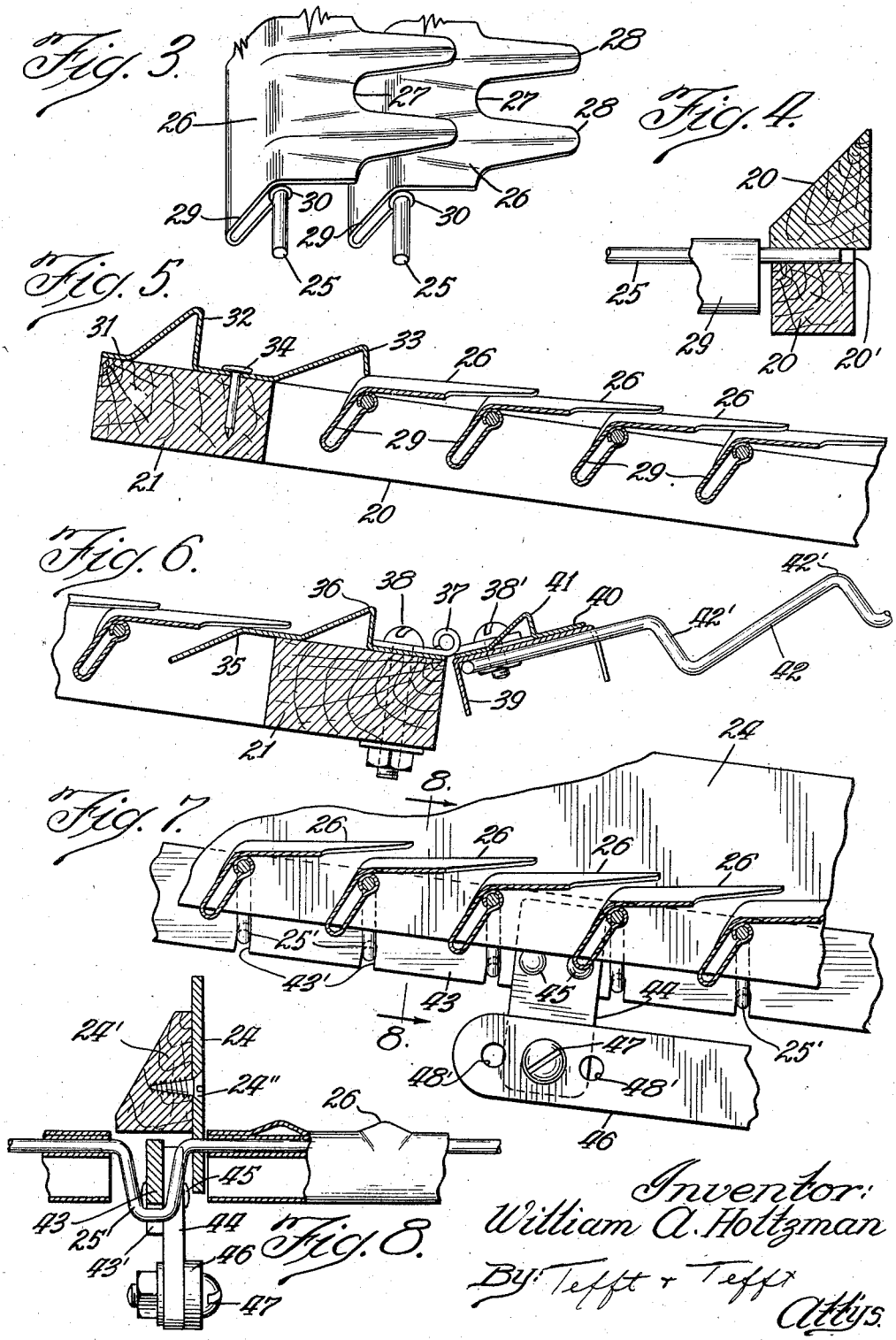

Patented Aug. 19, 1941

2,253,296

UNITED STATES PATENT OFFICE.

2,253,296

SCREEN FOR THRESHING MACHINES

William A. Holtzman, Peoria, Ill., assignor to Hart-Carter Company, Peoria, Ill., a corporation of Delaware Application November 21, 1938, Serial No. 241,615

3 Claims. (Cl. 209—394)

This invention relates to improvements in threshing machinery and particularly to an improved structure of adjustable chaffer and sieve pans.

It will be appreciated that operating conditions of combine harvester-threshers are quite different from the conditions of the standard stationary grain threshers. Where standard grain threshers are usually operated stationary on level ground, combine harvester-threshers are operated while being transported over rough uneven ground, side hills, downhill and uphill. These conditions require certain variations in the chaffer and seed pans, and it is to these improvements that my invention is directed. However, it has been found that these improvements are also effective on stationary standard grain threshers.

The particular object of my invention is to provide more effective structure for adjustable chaffer and seed pans.

Another object is to provide an adjustable chaffer and seed pan structure which is effective on combine harvesters while operating over rough hilly ground.

Another object is to provide an adjustable chaffer and seed pan structure that would more effectively utilize the air blast from the blower fan.

And a still further object is to provide an adjustable chaffer and seed pan structure which would be adaptable by adjustment variations etc., to a wire variety of grain and to different types and kinds of harvesters.

Other objects and benefits will be disc'osed by the following descriptions and drawings in which:

Fig. 1 is a sidewise tilted isometric view of my improved chaffer pan showing my adjustable stepped wire finger extension and an adjustable air blast deflector;

Fig. 2 is a bottom view of the chaffer pan and wire finger extension showing the slat adjustment mechanism;

Fig. 3 is an enlarged broken isometric view of a pair of chaffer slats to better show their relation to each other;

Fig. 4 is an enlarged sectional view of the chaffer pan side rail as it would appear on the section lines 4—4 of Fig. 1 to show the pivotal mounting of the slat wires;

Fig. 5 is an enlarged sectional view of the chaffer pan as it appears on the section lines 5—5 of Fig. 1;

Fig. 6 is an enlarged sectional view of the chaffer pan and stepped wire finger extension as they appear on the section line 6—6 of Fig. 1;

Fig. 7 is an enlarged sectional view of the chaffer slats and adjustment mechanism as they appear on section lines 7—7 of Fig. 1;

Fig. 8 is a sectional end view of the slat and adjustment mechanism on the section line 8—8 of Fig. 7;

Fig. 9 is a sidewise tilted isometric view of my grain sieve pan;

Fig. 10 is an enlarged sectional view of the grain sieve pan on the section lines 10—10 of Fig. 9;

Fig. 11 is a sectional end elevation view of my grain sieve as it appears on the section lines 11—11 of Fig. 9; and Fig. 12 is an enlarged broken view of a pair of sieve slats to better show their relation to one another.

It is assumed that the general structure of thresher apparatus and particularly the grain shoe is well understood. However, in order that the application of my invention be properly revealed, I will describe the typical thresher cleaning shoe that my invention contemplates. The grain pan extends to the adjustable chaffer and its construction is such that it delivers grain, coarse material, short straws, unthreshed heads, bean pods, etc., back on to the adjustable chaffer which is being oscillated backward and forward about one to one and one-half inches. The coarse material, etc., is carried back by this oscillating action to where the blast from the fan delivers it to the rear, thus preventing overloading. The grain, beans, or other threshed crop drops through the chaffer to the adjustable sieve for final cleaning. The coarse material, unthreshed heads, pods, etc., are carried by the chaffer to the adjustable extension. The adjustable extension is hinged and can be set at various angles to suit crop conditions. I utilize an adjustable air baffle at the end of this hinged extension in order to force the blast through the extension wires. The unthreshed heads, pods, etc., drop through the extension and are returned to the cylinder by means of the tailings auger and elevator to be rethreshed. The short straws and other coarse material are delivered by the adjustable extension through the blower fan housing and blower and thence to the stack in the case of a standard grain thresher or to the straw spreader in the case of the combine.

The grain which is dropped down on the adjustable sieve, passes through the sieve and to the grain auger to be delivered to the weigher, grain tank or sacker as the case may be. By properly regulating the sieve to suit the condition of crop, the chaff is blown out through the adjustable chaffer and extension. Any unthreshed heads or coarse material which might have fallen onto the sieve is delivered to the tailings auger to be returned through the cylinder. By properly regulating the adjustable sieve most crops, including many fine seed crops, are thoroughly cleaned, ready for the market.

It will be appreciated that in the case of combines where the machine is being transported over rough ground that the slats must work under widely variable conditions. The slats, which comprise the complete surface of the chaffer and sieve, are made to form continuous channels through which the grain passes directly over and through the meshes. In order to provide a structure which will cope with the variable conditions I have developed a design of slat wherein the formed fingers around the mesh openings are unusually long, in fact almost as long as the space between the adjusting wires. Further, these fingers overlap the adjacent slat nearly 50% of the wire spacing and on the rear of each slat I provide an angular baffle extension which has the effect of better controlling the air blast to effect proper cleaning. The greater the opening of the slat required for the crop, the greater the volume of air will be directed up through the slats for cleaning. The definite rib construction of my slats, in addition to forming channels for the grain, gives added strength and prevents the possibility of breaking or bending out of shape. Further, the length of the fingers around the sieve opening is effective in forcing the material over the slat and preventing clogging. This is particularly important in combines where on hillside operations baffles and sieves have a strong tendency to clog under unfavorable conditions.

Now referring to Figs. 1 and 2, I designate the side rails of my chaffer pan by the numeral 20 and the end rails by the numeral 21. These rails are held together as a frame by the angle plates 22. Baffle ribs 23 and 24 extend lengthwise of the frame dividing the frame for practical purposes into three lengthwise pans. There may be more or less of these lengthwise baffle ribs which are for the purpose of preventing threshed materials from sliding sidewise when the combine is on a side hill. By this means practically the full area of the pan is utilized.

Now referring to Figs. 3, 4, 5, 6, 7 and 8, showing the details of the structure, I designate by the numeral 25 the adjustment wires which extend sidewise across the pan in equally spaced relation to each other the full length of the pan. Fastened to these wires are chaffer slats which I generally designate by the numeral 26. As best shown in Fig. 3, these chaffer slats have sieve or mesh openings 27 which are disposed between rather long fingers 28 which are formed in ridges central of the fingers. These ridges or ribs form continuous channels in the surface of the chaffer pan through which the grain passes through the sieve openings 27 which are adjustable in size as the chaffer slats are rocked on the adjustment wires 25 by means of the crank arms 25' as will later be more fully explained. On the opposite end of the chaffer slats from the fingers 28 are formed angular blast baffles 29. In the case of the chaffer slat these baffles extend downward rather abruptly and thus afford means for deflecting air blast from the fan directly between the chaffer slats, the degree of deflection, of course, being regulated by the amount the chaffer slats are tilted. The slats 26 are attached to the adjustment wires 25 by means of loops 30 and are adjusted so that the sieve openings are uniform throughout the area of the frame. After this adjustment is made, they are fixed to the cross wires by any suitable means such as spot welding. The cross wires, as shown in Fig. 4, are pivotally mounted in the side rails 20 by means of journal bearing holes 20'.

Now referring to Fig. 5, it will be noted that a cross steel step member 31 is fastened to the end rails 21 by nails 34. Two right angle steps 32 and 33 are formed in the member 31, thereby providing means for moving the threshed materials forward when the chaffer pan is oscillated backward and forward. I have found that this step member is quite necessary because without such provision a dead space is formed at the cross rail which has a tendency to permit the threshed material to pile up, thereby decreasing the efficiency of the pan. Likewise at the opposite end of the pan, as shown in Fig. 6, is a cross member 35 having a right angle step 36. This member is held in place by the hinges 37 and the bolt 38. On the cross rail 39 of the adjustable step wire finger extension is another step feeding member 40 with an angular step 41 formed therein. This member is held on the rail 39 by means of bolts 36' through the hinge 37. It will be apparent that by means of these two step members 35 and 40 I have again provided means whereby the threshed material is propelled off of the chaffer frame and onto the step wire finger extensions rather than to permit it to lodge dormant with the danger of clogging the chaffer frame.

The step wire finger extensions 42 are formed in loops, making a double finger, as best shown in Fig. 2. These loop fingers are held in slots through the side of the channel member 39 and are spot welded securely in place in the channel member 39. The multiple step sections 42 acting as successive step impellers will naturally catch and propel the threshed material forward as the chaffer frame is oscillated backward and forward. Because of this action I can set the angle of the adjustable wire extension somewhat abruptly without danger of clogging, because the multiple step impellers on the wire finger extensions move the straw forward and do not permit it to fall back to cause clogging. Then by the blast baffle, as best shown in Fig. 1, I can force the air blast through this material and more effectively accomplish the results intended. This adjustable blast baffle is merely a cross plate 52 with slotted openings 54 held by thumb screws 55 on an angle member 53 fixed in the thresher shoe.

Now referring to Figs. 7 and 8, a sliding adjustment bar 43 is mounted over slotted openings 43' on the crank extensions 25' of the adjustment wires 25. Attached to this sliding adjustment bar 43 is an arm 44 attached by rivets 45. A link 46 is pivotally attached to the arm 44 by means of the bolt 47. Additional adjustment holes for variable conditions are provided as shown by the numeral 48'.

Now referring to Fig. 2, it will be apparent that the link 46 is pivotally attached to a bell crank 48 which is resiliently affixed to a ratchet member 49 bolted directly to the end rail 21. A depressed notch 51 in the bell crank 48 engages the notches 50 in the ratchet plate and thereby holds the bell crank 48 in any desired position. It will thus be apparent that I have provided means whereby the chaffer slats may be uniformly and quickly adjusted to any desired opening. Usually this is done from outside of the thresher by means of a rod attached through the hole 48" in the bell crank 48.

Now referring to Figs. 9, 10, 11 and 12, I show a general view and details of my sieve pan. Side rails 56 joined by end rails 57 generally form a frame in which the adjustment wires 73 are pivotally mounted in an exactly similar manner as that described for my chaffer pan. However, in this case of the sieve pan I provide multiple baffle ribs 59, 60, 61, 62 and 63, extending lengthwise of the sieve pan and for all practical purposes dividing the general sieve pan into six narrow pans, extending lengthwise. This is done for the purpose of utilizing the entire area of the pan when the thresher is being transported on a side hill. The baffle ribs 59 to 63 prevent the grain from sliding sidewise and thus the area of the pan is more effectively utilized.

As shown in Fig. 10, I again mount the stepped cross member 54 on the end rail 57. Two right angle steps 65 and 66 are formed in this member and thus provide means whereby the grain and threshed material are moved forward over the pan area rather than to be permitted to stop on the smooth upper surface of the end rail 57.

Similarly on the opposite end of the sieve pan another step member 58 is attached having a single step 67. This is for the same purpose as described for the steps 65 and 66.

Now referring to Figs. 10 and 12, it will be noted that my sieve slat 68 is of considerably different form than the chaffer slat 26 as heretofore described. The sieve openings 70 are very much smaller, the sieve fingers 69 extending beyond the opening 70 are very much shorter, and the baffle extension 71 projecting about half of the distance between the cross wires depending downward at a very much smaller angle. The fingers 69 are embossed in ridges which in effect form continuous channels through which the grain is conducted to the sieve openings 70. These sieve pans are divided longitudinally by baffle ribs 59, 60, 61, etc., which effectively distribute the grain over the entire surface area of the sieve. The end of the finger stops approximately even with the adjacent cross wire and as the baffle extension is detending downwardly at a slight angle, it will readily be appreciated that a fine adjustment of the sieve opening may be attained by tilting the sieve slats. The baffle extensions being at a lesser angle, the air blast deflected through the sieve openings is more gentle and this also aids in permitting a fine sieve opening adjustment.

As previously described, for the chaffer slats 26 the sieve slats 69 are attached to the adjustment wires 73, then adjusted uniformly throughout the entire area after which they are solidly affixed to the cross wires by means of spot welding or the like. This slat adjusting mechanism is exactly similar to that described for my chaffer slats and will not again be described.

I have previously described the general operation of my chaffer and sieve pans and now with the above explanation of the detail structure, it is believed that the entire mechanism is clearly understood.

I claim:

1. In a chaffer pan device for threshers, a frame, hinged adjusting wires extending crosswise of said frame, slat adjusting mechanism coacting with said cross wires, baffle slats attached to said wires, each of said baffle slats being abruptly bent intermediate its side edges to form a flat front finger section and a downwardly bent rear blast deflector section, said finger section having multiple longitudinal fingers formed crosswise of the slats extending approximately half way across the front of the finger section, each of said fingers and aligned portions of the finger sections being formed in convex cross section, each of said fingers overlapping the aligned portion of the adjacent finger section by approximately half the length of the finger.

2. In a chaffer pan device for threshers, a frame, hinged adjusting wires extending crosswise of said frame, slat adjusting mechanism coacting with said cross wires, baffle slats attached to said wires, each of said baffle slats being abruptly bent intermediate its side edges to form a flat front finger section and an abrupt downwardly bent rear blast deflector section, said finger section having multiple longitudinal rounded end fingers formed cross wise of the slat extending approximately half way across the front of the finger section, each of said fingers and aligned portions of the finger section being formed in convex cross section, each of said fingers overlapping the aligned portion of the adjacent finger section by approximately half the length of the fingers, the arrangement providing longitudinal ridges in the chaffer pan with the sides and rounded ends of the fingers serving to direct grain between the fingers and through the openings at the base of the fingers.

3. In a chaffer pan device for threshers air blast winnowing means, a frame, hinged adjusting wires extending cross wise of said frame, slat adjusting mechanism coacting with said cross wires, baffle slats attached to said wires, a stepped wire finger extension adjustably hinged on the discharge end of said frame, a vertical blast baffle positioned closely beneath the free ends of the fingers adjustable vertically to deflect air blasts from below the frame to a point considerably above the end of the frame, said adjustable stepped wire extension being positioned to coact with the upward air blast deflected by the baffle to permit abrupt upward angular setting of the extension thereby to lift and agitate the straw abruptly in a vertical direction to provide effective cleaning action without clogging the chaffer pan.

WILLIAM A. HOLTZMAN.